Figure 1:
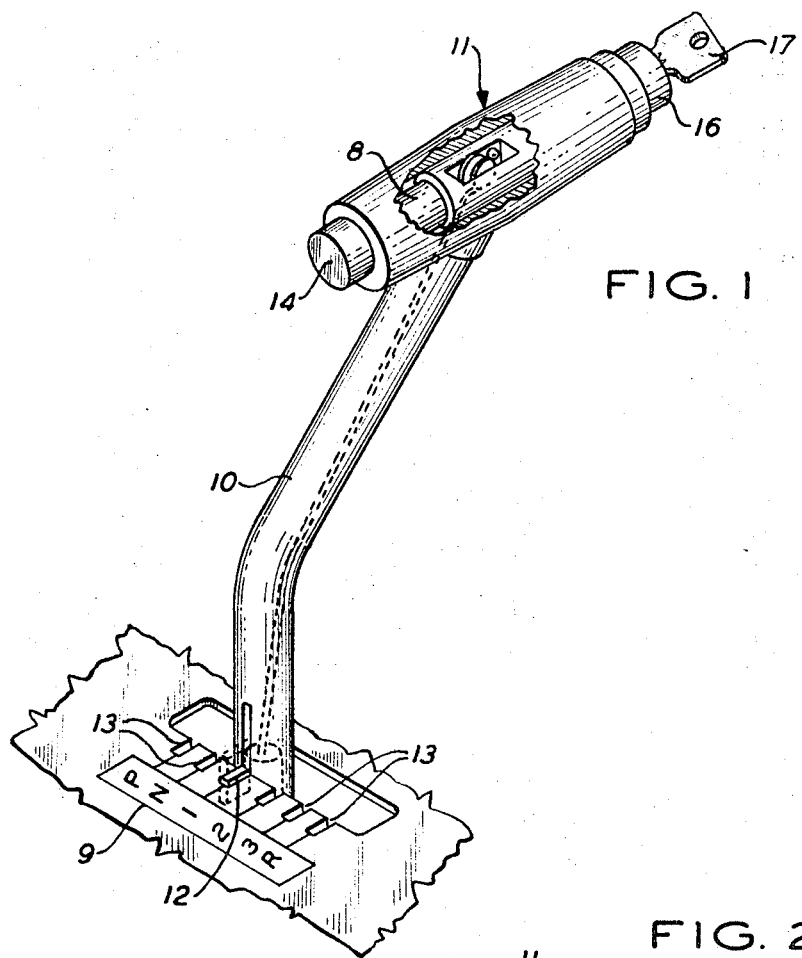

United States Patent

[11] 3,583,184

[72] Inventor Louis N. Papale
 27 Glen Road, West Orange, N.J. 07052
[21] Appl. No. 848,440
[22] Filed Aug. 8, 1969
[45] Patented June 8, 1971

[54] TRANSMISSION LOCK FOR MOTOR VEHICLES
 3 Claims, 3 Drawing Figs.
[52] U.S. Cl............................................... 70/193,
 70/215, 70/247, 74/473, 74/535
[51] Int. Cl......................................................B60r 25/06,
 G05g 5/06
[50] Field of Search.......................................... 70/193,
 194, 195, 201, 215, 217, 247, 181; 292/PBO;
 74/473, 475, 523, 535, 536, 491; 292/166, 168,
 174

[56] References Cited
UNITED STATES PATENTS

| | | | |
|---|---|---|---|
| 1,022,401 | 4/1912 | Chevrolet et. al......... | 74/535X |
| 1,499,427 | 7/1924 | Tullar........................... | 74/473 |
| 1,655,473 | 1/1928 | Mickaelson.................. | 74/535X |
| 3,431,755 | 3/1969 | Eisenman..................... | 70/181 |

*Primary Examiner*—Albert G. Craig, Jr.
*Attorney*—Popper, Bain & Bobis

ABSTRACT: A transmission lock for motor vehicles, in which a latch assembly is connected to a gear selector lever arranged in opposition with a lock which, when it is adjusted to locked position, blocks the movement of a button that releases the latch assembly.

PATENTED JUN 8 1971  3,583,184

INVENTOR
LOUIS N. PAPALE

BY
Popper, Bain & Bobis
ATTORNEY

TRANSMISSION LOCK FOR MOTOR VEHICLES

BACKGROUND OF INVENTION

1. Prior Art

Vehicular theft has become one of the most frequent crimes. Ignition system locks are circumvented, by 'jump wires' used to bridge the open circuit for ignition provided by an ignition lock. Steering column locks are coming into general use, but force can in some cases destroy the lock, which in any event must be built into the steering column. Transmission locks are quite efficient, but must be designed as part of the transmission and are often quite costly.

2. Field of the Invention

This invention relates generally to transmission locks for motor vehicles and specifically to transmission locks which immobilize the gear selector lever for the transmission.

SUMMARY OF THE INVENTION

It has been found that a lock can be provided for the gear selector lever which is inexpensive, will immobilize the lever so that the engine of the vehicle cannot be started, if in gear, and the gears of the transmission cannot be engaged if the lever has been locked in neutral, or disengaged position. This is accomplished, in vehicles having a button release for the gear selector lever, by providing a pushbutton lock which is disposed in opposition to the pushbutton release. When the pushbutton-type lock is in locked position, it is in abutment with the pushbutton release of the gear selector lever, so that the gear selector lever is blocked from movement, and the gears of the vehicle may not be engaged for operation. When the pushbutton-type lock is in unlocked position, it is spaced away from the end of the pushbutton release of the gear selector lever, so that the button may be operated to release the lever by unlatching it, and a driving gear may be selected.

DRAWINGS

Figure 2:
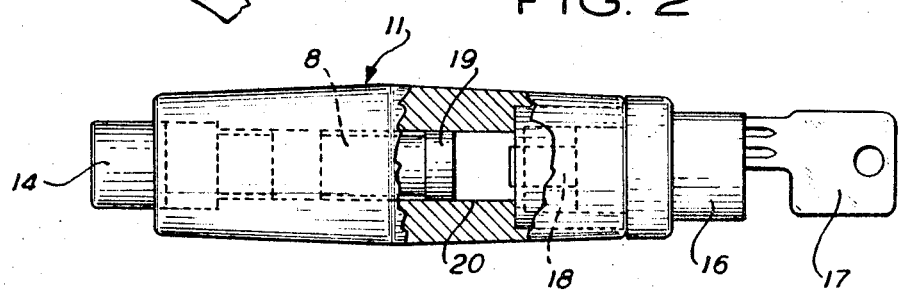
Figure 3:
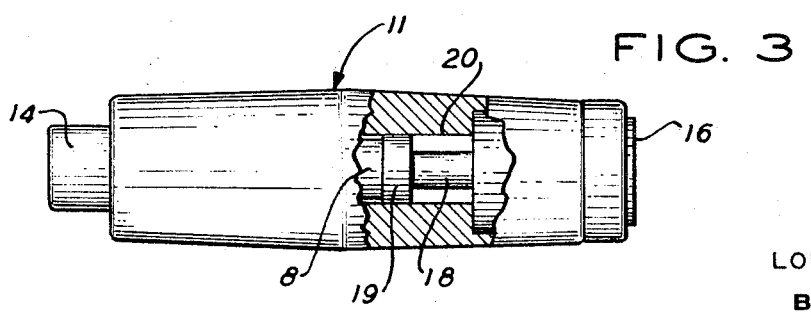

These objects and advantages as well as other objects and advantages may be attained by the device shown by way of illustration in the drawings in which, FIG. 1 is a perspective view of a gear selector assembly and latching arrangement;

FIG. 2 is a side elevational view, partially sectioned, of the handle of the gear selector; and FIG. 3 is a side elevational view, partially sectioned, showing the handle of the gear selector lever with the lock in locked position.

PREFERRED EMBODIMENT

Referring now to the drawings in detail, there is shown a handle 11, which mounted on the gear selector lever 10 of motor vehicle. A latch 12, engaged with one of several stationary slots 13 serves to affirmatively position the lever 10 in any one of several positions, which engage a gear selected by mechanical linkage (not shown) with the lever 10. The movement of the handle 11 forward or backward determines the gear of the transmission which is selected to be rendered operative as indicates by the scale 9. The latch 12 is disengaged from the slot 13 with which it has been engaged by pressing button 14 defined by the end of a bolt 8, slidably mounted in the handle 11. By a suitable connection with the bolt 8, the latch 12 is disengaged from the locating and locking slots 13, so that the lever is released from a locked condition, and can be moved to select any mode of operation for the transmission. The bolt 8 is an elongated body, slidable in the handle, and normally urged by the latch assembly spring 15 to a position with the button 14, as shown in FIGS. 1 and 2.

Mounted in the opposite end of the handle 11, there is a pushbutton-type lock 16. By a pushbutton-type lock, it will be understood that this type is one of the numerous locks which have an exposed end portion which may be pressed inwardly until the lock mechanism seizes the button and holds it in that position. Upon application of a key 17 to the lock, the lock button, which is spring loaded, is released and it extends outwardly, as shown in FIG. 1 and 2. Locked, it is held in the position shown in FIG. 3. There are many pushbutton-type locks, as for example: "Translock" fully disclosed in U.S. Pat. No. 3,434,315; similar pushbutton-type locks are available from Corbin Division of Emhart Company, New Britain, Conn. (currently model 002291); also Yale Lock Company Division of Yale and Towne, White Plains, N.Y. Such a lock is to be provided with a stop 18, in the nature of a rear-end enlargement, that blocks the movement of an object which the lock is intended to hold and engage against further movement. The lock 16 is attached to the handle, so that in an unlocked state, the stop 18 is sufficiently spaced away from the rear-end 19 of the selector button 14, to permit the button to be pressed inwardly, overcoming the spring 15, and moving the end 19 into the space 20, and at the same time disengaging the latch from any slot 12, so that the lever may be moved.

However, when the lock 16 is pressed inwardly to locking position as shown in FIG. 3, the stop 18 moves into abutment with the inner-end 19 of the bolt 8. In this manner, the bolt 8 is immobilized, and the gear selector lever handle 11 may not be moved, because the bolt 8 is unable to disengage the latch 12 from the chosen notch 13. In this manner, unauthorized operation of a motor vehicle is accomplished, by a second means, in addition to the first means: the conventional ignition lock.

The foregoing description is merely intended to illustrate an embodiment of the invention. The component parts have been shown and described. They each may have substitutes which may perform a substantially similar function; such substitutes may be known as proper substitutes for the said components and may have actually been known or invented before the present invention.

What I claim:

1. A transmission lock for a motor vehicle comprising
   a. a movable gear selector operably connected to a motor vehicle transmission,
   b. a hollow handle attached to the gear selector lever,
   c. a bolt slidably mounted in the handle with one end of the bolt extending therefrom and defining a pushbutton,
   d. a pushbutton lock attached to the hollow handle at the end opposite the bolt,
   e. the pushbutton lock having a pushbutton key-receiving portion extending outwardly from the hollow handle,
   f. the inner end of the pushbutton lock disposed in spaced relation to the inner end of the bolt, when unlocked, and in abutment with the inner end of the bolt when locked,
   g. the bolt and the lock disposed coaxially with respect to each other, and coaxially movable in the hollow handle.

2. The device according to claim 1 and
   a. a means to engageably and disengageably latch the lever in any one of a plurality of chosen positions, said means operably connected to the bolt.

3. The device according to claim 1 and: bolt,
   a. a latch, operably attached to the and and connected to the bolt,
   b. a plurality of stationary slots positioned for engagement with the latch, each slot defining a position at which the gear selector lever engages the transmission of a motor vehicle for a chosen mode of operation.